June 17, 1958     E. C. KIEKHAEFER     2,838,946
POWER TRANSMISSION SYSTEM
Filed Oct. 22, 1954
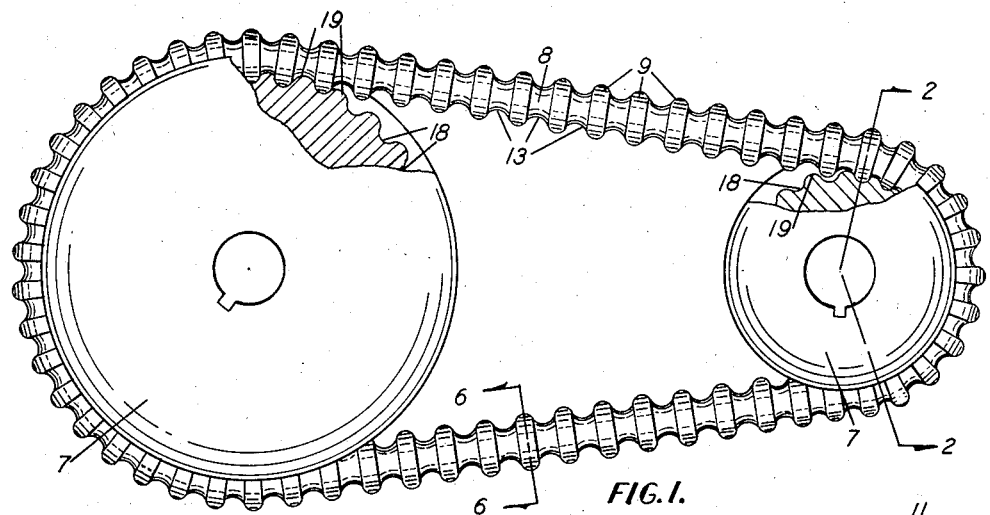
FIG. 1.
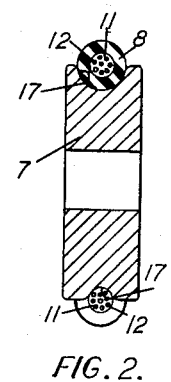
FIG. 2.
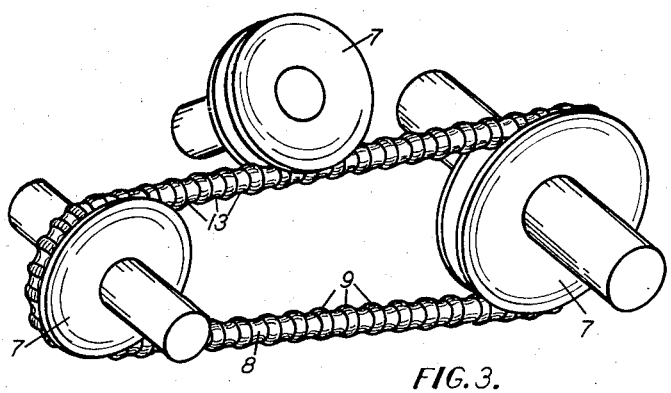
FIG. 3.
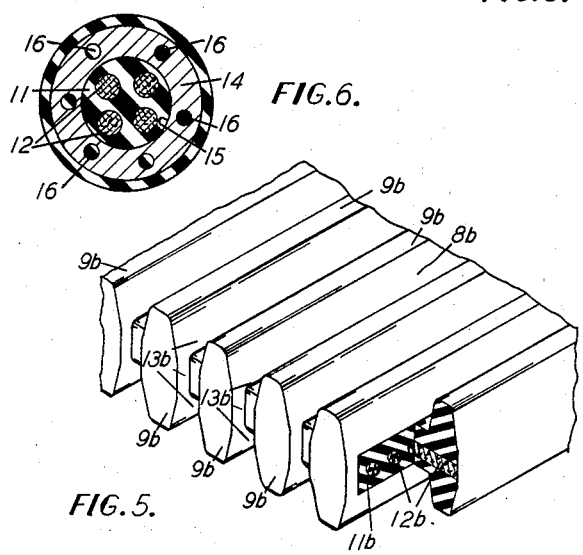
FIG. 6.
FIG. 5.
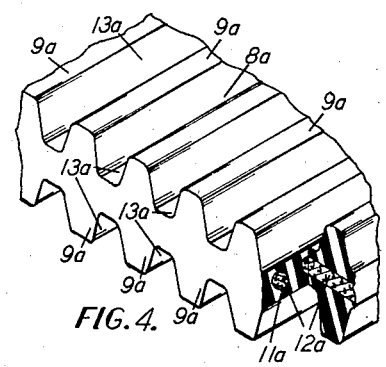
FIG. 4.
INVENTOR
ELMER C. KIEKHAEFER
BY Steve W. Gremban
ATTORNEY United States Patent Office 2,838,946
Patented June 17, 1958

2,838,946
POWER TRANSMISSION SYSTEM
Elmer C. Kiekhaefer, Cedarburg, Wis.
Application October 22, 1954, Serial No. 463,999
2 Claims. (Cl. 74—229)

This invention relates generally to a positive power transmission system and more specifically to an improved endless belt and pulley combination with the belt having spaced projections thereon adapted to positively engage the pulley to transmit power thereto.

In the highly developed art of positive power transmission systems employing a drive and a driven pulley or sheave over which a belt is trained, many power transmission systems have been made to transmit power to pulleys lying in the same plane as the system. In these power transmission systems, the area of contact between the belt and the drive pulley is equal to the arc of contact of the belt and the pulley multiplied by the width of the belt. In certain applications where high power requirements are needed, the width of the belt and pulley must necessarily be large to provide the required power. Applicant proposes an improved power transmission system adapted to transmit power to pulleys in planes other than the system comprising the drive pulley, driven pulley and belt. Furthermore, applicant's power transmission system is capable of transmitting greater power at a given velocity for a given width of belt and drive pulley than prior known positive power transmission systems.

Many belts have been made for use in positive power transmission systems which are satisfactory for a particular purpose or in a particular installation. Thus, where the belt is trained over relatively large pulleys or sheaves and the bending of the belt is small as it passes over the pulleys, belts have been produced which operate satisfactorily and have a relatively long useful life. The same belts, however, if used with pulleys of a size below a certain critical diameter are not satisfactory and will wear unduly. Applicant's invention includes an improved belt for a positive power transmission system capable of great flexibility and thereby adapted for use with small diameter pulleys.

A belt consists of a number of component parts, each serving a particular purpose and when properly integrated they mutually contribute to provide a belt having longer life. Thus, a tension component is recognized as necessary and the belt must also have pulley engaging surfaces which not only take the principal wear to which the belt is subjected, but also transmit forces between the pulley surfaces and the tension component. Applicant's novel belt is constructed to present a greater pulley engaging surface area for a pulley of a certain width than prior known flat belts whereby a greater amount of power may be transmitted thereby.

In addition to providing a "high performance" belt that is capable of great flexibility and thereby adapted for use with small diameter pulleys, applicant provides an improved positive drive belt having spaced projections adapted to engage complementary grooves in a pulley whereby the belt is guided in one plane and prevented from moving laterally off of the pulley. Furthermore, applicant's improved belt is capable of driving a plurality of pulleys utilizing all portions of the belt, and is suitably adapted to drive low torque pulleys that lie in a different plane than the driving pulley.

It is therefore an object of the present invention to provide an improved positive power transmission system for transmitting greater power at a given velocity for a predetermined width and diameter of drive pulley than prior known systems.

Another object of the invention is to provide an improved pulley for a positive power transmission system capable of transmitting greater power at a given angular velocity for a predetermined width and diameter of pulley than prior known positive drive pulleys.

Another object of the invention is to provide an improved belt which is sufficiently flexible to satisfactorily operate over relatively small pulleys and is capable of absorbing high tensional stresses.

Another object of the invention is to provide an improved belt that has optimum flexibility, yet sufficient rigidity to render it stable in shape when subjected to load conditions.

Another object of the invention is to provide an improved belt having spaced projections thereon adapted to engage corresponding grooves in a pulley whereby the belt is guided in a single plane and prevented from moving laterally.

Another object of the invention is to provide an improved belt having spaced projections thereon adapted to engage corresponding grooves of a plurality of pulleys, some of which are positioned in different planes with respect to one another.

Objects and advantages other than those set forth above will be apparent from the following description when read in connection with the accompanying drawing, in which:

Fig. 1 is a side elevation view partially in section of a belt transmission system embodying the invention;

Fig. 2 is a section view taken along line 2—2 of Fig. 1;

Fig. 3 is a perspective view of the belt transmission system embodying the invention;

Fig. 4 is a perspective view partially in section of a modified embodiment of the belt employed in the invention;

Fig. 5 is a perspective view partially in section of another embodiment of the belt employed in the invention; and Fig. 6 is a section view taken along line 6—6 of Fig. 1 showing a strengthening or reinforcing member incorporated in the belt.

As shown in the drawings, a preferred embodiment of the invention is illustrated as applied to pulleys 7 over which a belt 8 having spaced projections or ridges 9 thereon is guided. The belt 8 comprises essentially a neutral axis zone 11 which is strengthened by longitudinal cords 12 imbedded in a rubber-like composition. It will be understood that a great number of inextensible materials are suitable for the neutral axis strength band. Thus, for example, cords as well as fabric cables, metal mesh, metal bands, plain or perforated, may be used with equal satisfaction.

Positioned about the neutral axis zone 11 as shown in Figs. 1 and 2 is an outer zone comprising a series of the spaced projections or ridges 9 having a circular outer surface with the ridges forming grooves 13 therebetween. The ridges 9 are formed of a rubber-like material having a high degree of rigidity and are preferably bonded to the neutral axis zone 11. The ridges 9 may be reinforced by insertion of metal disks 14 as shown in Fig. 6 transverse to the neutral axis zone 11 and having an opening 15 through which the neutral axis zone extends.

The disks 14 may be provided with holes 16 so that during vulcanization the rubber composition penetrates the holes 16 in the disks 14 whereby the disks are firmly anchored in the rubber composition.

The pulley 7, shown in section in Fig. 2, is a circular disk having an annular channel 17 in the outer periphery thereof. The channel 17 defines a series of alternately spaced grooves 18 and ridges 19 complementary to the ridges 9 and grooves 13, respectively, of the belt 8 with a cross section of the channel 17 at any point of the periphery by a plane containing the axis of the pulley 7 being generally semi-circular.

In Fig. 4, a modification of the belt 8a of the present invention is illustrated in which the belt is formed having a generally rectangular cross section. The neutral axis zone 11a is strengthened by longitudinal cords 12a imbedded in a rubber-like composition. The outer zone of the belt comprises an upper or tension section of the belt which is provided with transverse ridges 9a and grooves 13a, and a lower compression section which is similarly provided with transverse ridges 9a and grooves 13a in register therewith.

In Fig. 5, another modification of the belt 8b of the present invention is illustrated wherein the ridges 9b shown in Fig. 5 have an outer surface that is generally rectangular and extend past the neutral axis zone 11b to provide a series of ridges 9b and grooves 13b along the side of the belt 8b adapted to drive a pulley lying in a plane normal to the driving pulley.

Although several embodiments have been illustrated and described, it will be apparent to those skilled in the art that other changes and modifications may be made therein without departing from the spirit of the invention or from the scope of the appended claims.

It is claimed and desired to secure by Letters Patent:

1. A power transmission system comprising: a drive sheave and a driven sheave each having a periphery which in progressive radial cross section forms a series of progressively increasing and decreasing semi-circular peripheral recesses which merge together to form a channel defining alternately spaced first grooves and first ridges; and a belt connecting said drive and said driven sheaves in a manner such that said drive sheave transmits its power to said driven sheave, said belt having a circular peripheral surface of progressively increasing and decreasing diameter to form alternately spaced second ridges and second grooves respectively adapted to engage substantially the entire surface area presented by said first grooves and said first ridges respectively of said drive and said driven sheaves.

2. A power transmission system comprising, a drive sheave and a driven sheave each having a periphery which in progressive radial cross section forms a series of progressively increasing and decreasing transverse peripheral recesses which merge together to form a channel defining alternately spaced first grooves and first ridges; and a belt connecting said drive and said driven sheaves in a manner such that said drive sheave transmits its power to said driven sheave, said belt having a peripheral surface of progressively increasing and decreasing section to form alternately spaced second ridges and second grooves respectively adapted to engage substantially the entire surface area presented by said first grooves and said first ridges respectively of said drive and said driven sheaves.

References Cited in the file of this patent

UNITED STATES PATENTS

| | | |
|---|---|---|
| 1,610,942 | Gammeter | Dec. 14, 1926 |
| 1,828,136 | Freedlander | Oct. 20, 1931 |
| 1,982,869 | Heyer | Dec. 4, 1934 |
| 2,554,331 | Hunter | May 22, 1951 |
| 2,554,372 | Mathieu | May 22, 1951 |
| 2,699,685 | Waugh | Jan. 18, 1955 |
| 2,728,239 | Adams | Dec. 27, 1955 |

FOREIGN PATENTS

| | | |
|---|---|---|
| 607,308 | Great Britain | Aug. 27, 1948 |
| 517,269 | Belgium | July 29, 1953 |